United States Patent
Tsukio et al.

(10) Patent No.: US 8,064,558 B2
(45) Date of Patent: Nov. 22, 2011

(54) RECEIVING APPARATUS

(75) Inventors: Yasunobu Tsukio, Osaka (JP); Hiroaki Ozeki, Osaka (JP)

(73) Assignee: Panasonic Corporation, Osaka (JP)

( * ) Notice: Subject to any disclaimer, the term of this patent is extended or adjusted under 35 U.S.C. 154(b) by 229 days.

(21) Appl. No.: 12/090,121

(22) PCT Filed: Aug. 28, 2007

(86) PCT No.: PCT/JP2007/066588
§ 371 (c)(1),
(2), (4) Date: Apr. 14, 2008

(87) PCT Pub. No.: WO2008/029661
PCT Pub. Date: Mar. 13, 2008

(65) Prior Publication Data
US 2009/0161807 A1    Jun. 25, 2009

(30) Foreign Application Priority Data
Aug. 29, 2006    (JP) .................. 2006-231733

(51) Int. Cl.
*H04L 7/00*    (2006.01)
(52) U.S. Cl. ........ 375/354; 375/260; 375/267; 375/299; 375/340; 375/347; 375/362; 375/365; 375/366; 375/368; 455/101; 455/132; 455/296; 455/500; 455/502; 370/509; 370/510
(58) Field of Classification Search .......... 375/260, 375/267, 299, 340, 347, 354, 362, 365, 366, 375/368; 455/101, 132, 296, 500, 502; 370/334, 509, 510
See application file for complete search history.

(56) References Cited

U.S. PATENT DOCUMENTS

| | | | |
|---|---|---|---|
| 7,353,012 B2* | 4/2008 | Miyano et al. | 455/277.1 |
| 7,369,622 B2* | 5/2008 | Ueno et al. | 375/267 |
| 7,457,384 B2* | 11/2008 | Hamamoto | 375/347 |
| 2006/0209979 A1* | 9/2006 | Sandell et al. | 375/267 |

FOREIGN PATENT DOCUMENTS

| | | |
|---|---|---|
| JP | 10-233969 | 9/1998 |
| JP | 11-041196 | 2/1999 |
| JP | 2002-368712 | 12/2002 |
| JP | 2002-368712 A | 12/2002 |
| JP | 2005-045508 A | 2/2005 |
| JP | 2006-013689 | 1/2006 |
| JP | 2006-013689 A | 1/2006 |

OTHER PUBLICATIONS

International Search Report Dated Nov. 27, 2007.
European Search Report for PCT/JP2007-066588 dated Feb. 4, 2011.

* cited by examiner

*Primary Examiner* — Leon Flores
(74) *Attorney, Agent, or Firm* — Pearne & Gordon LLP

(57) ABSTRACT

A receiving apparatus includes a first receiver, a second receiver, a received signal synthesizer connected to the first and second receivers, a synchronizing signal synthesizer connected to the first and second receivers, and a synchronization detector connected to the synchronizing signal synthesizer. In this structure, synchronization determination is performed using a synchronizing signal of either the first or second receiver, and diversity reception is performed using the received signals of the first and second receivers.

15 Claims, 4 Drawing Sheets

FIG. 4

| Channel number | Broadcaster name |
|---|---|
| 1ch | NHK educational channel |
| 2ch | NHK general channnel |
| 4ch | MBS Mainichi |
| 6ch | ABC TV |
| 7ch | TV Osaka |
| 8ch | Kansai Television |
| 10ch | Yomiuri Television | ly, a
RECEIVING APPARATUS

THIS APPLICATION IS A U.S. NATIONAL PHASE APPLICATION OF PCT INTERNATIONAL APPLICATION PCT/JP2007/066588.

TECHNICAL FIELD

The present invention relates to a receiving apparatus which performs a channel search in diversity reception of digital broadcasting.

BACKGROUND ART

In recent years, digital broadcasting has adopted orthogonal frequency division multiplex (hereinafter, OFDM) systems. Such systems including the OFDM systems are suitable for mobile reception of digital broadcasting and have been put to practical use in, for example, car navigation systems and portable phones. Digital broadcasting has also adopted a diversity reception technique using a plurality of antennas in order to improve mobile reception performance.

A channel selection requires a channel selection table showing the correspondence between the channel number and the broadcaster. The channel selection table showing the correspondence between the channel number having a program on the air and the broadcaster should be formed (hereinafter, channel search) by searching all channels every time the mobile receiving terminal moves from one region to another. This is because the channel assignment for broadcasters differs from region to region.

The channel search in a digital broadcasting receiving apparatus generally requires two steps. The first step is to set the frequency to the receiver and to detect whether or not synchronization has been established. The second step is to perform error correction and decoding in the subsequent stages when synchronization has been established and to acquire the broadcaster name. In the second step, time interleaving and decoding are particularly time-consuming, making the channel search time much longer than in analog broadcasting.

To reduce the channel search time, it has been suggested to utilize a diversity receiving apparatus having a plurality of receivers. For example, one receiver can be used to view a program (hereinafter, single reception) and the other receiver can be used to perform a channel search. Alternatively, a plurality of receivers can be used to receive a plurality of channels and to select the channels sequentially.

One of the prior arts related to such methods is Patent Document 1 shown below.

A channel search in single reception, however, is likely to cause detection failure because the sensitivity of single reception is lower than that of diversity reception, namely, by about 3 dB. For example, when single reception has an image reproduction sensitivity of −99 dB, diversity reception has an image reproduction sensitivity of −102 dB. As a result, in a reception environment with an electric field intensity of, for example, −100 dB, a signal can be received by diversity reception, but not be detected by a channel search in single reception.

Furthermore, small terminals generally cannot adopt the technique of receiving a signal by one receiver and performing a channel search by the other receiver. This is because in general small terminals have two receivers to perform diversity reception, but have only one error corrector and one decoder such as an MPEG decoder for decoding compressed signals in order to reduce size and power consumption. In this structure, the error corrector and the decoder are occupied while a signal is being received by one receiver, making it impossible for the other receiver to execute the above-described second step in the channel search.

Patent Document 1: Japanese Patent Unexamined Publication No. 2006-13689

SUMMARY OF THE INVENTION

The present invention has an object of providing a diversity receiving apparatus capable of performing a channel search at high speed and without detection failure.

The receiving apparatus according to the present invention includes a first receiver; a second receiver; a received signal synthesizer connected to the first receiver and the second receiver; a synchronizing signal synthesizer connected to the first receiver and the second receiver; and a synchronization detector connected to the synchronizing signal synthesizer.

This structure makes use of the difference in synchronization sensitivity between single reception and diversity reception. More specifically, to perform a channel search, the received signal synthesizer performs diversity reception and the synchronizing signal synthesizer performs synchronization determination using a synchronizing signal of either the first receiver or the second receiver. When the synchronization is established, the above-described second step is executed to acquire the broadcaster name and then the next channel is searched. When the synchronization detection cannot be performed, the next channel is immediately started to be searched. This procedure greatly reduces the time required for a channel search.

BRIEF DESCRIPTION OF THE DRAWINGS

FIG. 4 shows the correspondence between the channel that has been detected to have a broadcast wave and the broadcaster name.

REFERENCE MARKS IN THE DRAWINGS

Figure 1:
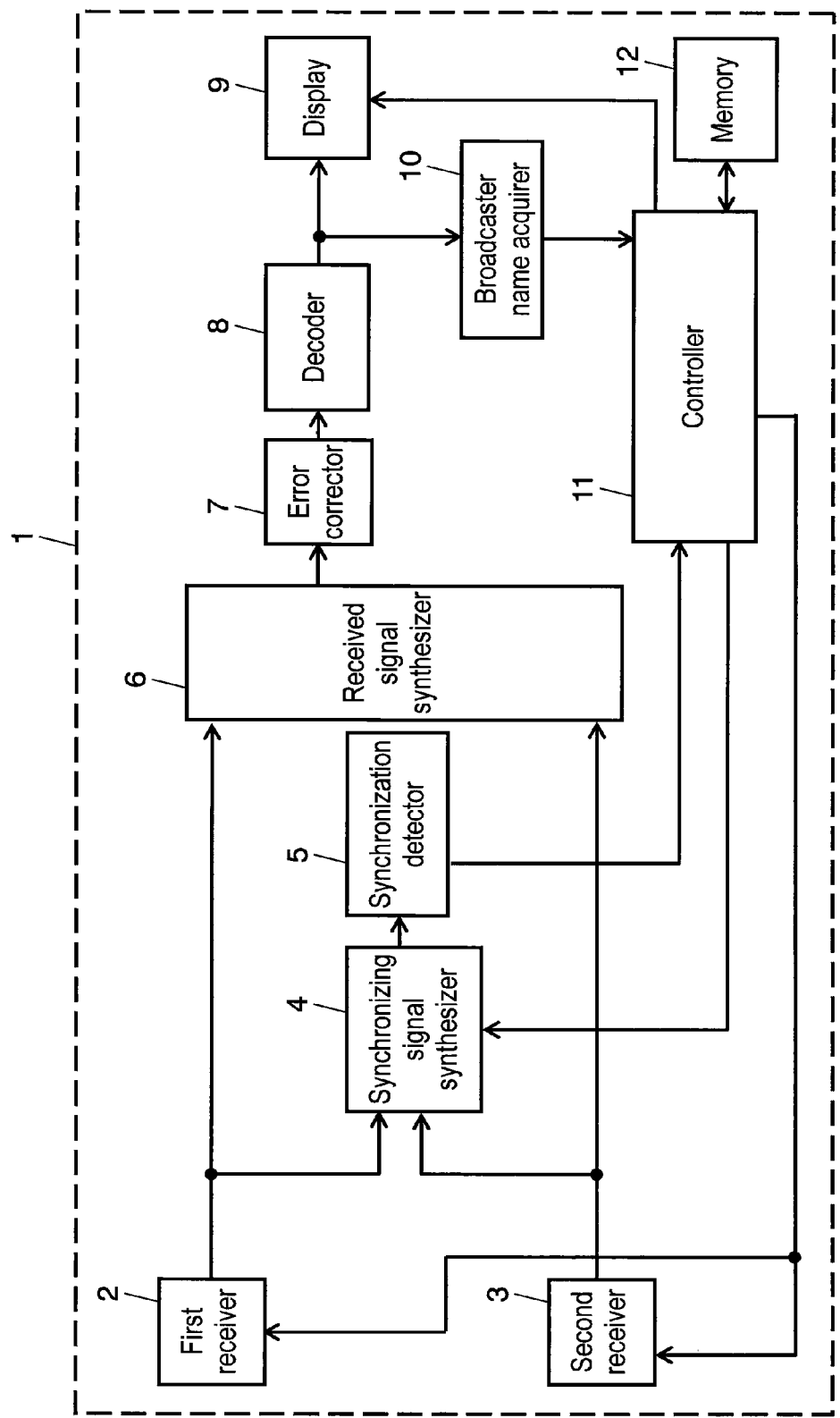
FIG. 1 is a block diagram of a receiving apparatus according to a first embodiment of the present invention.

1 receiving apparatus
2 first receiver
3 second receiver
4 synchronizing signal synthesizer
5 synchronization detector
6 received signal synthesizer
7 error corrector
8 decoder
9 display
10 broadcaster name acquirer
11 controller
12 memory

DETAILED DESCRIPTION OF PREFERRED EMBODIMENT

First Embodiment

A first embodiment of the present invention is described as follows. FIG. 1 is a block diagram of a receiving apparatus according to the first embodiment. Receiving apparatus 1 of the present embodiment includes first receiver 2, second receiver 3, received signal synthesizer 6 connected to first and second receivers 2 and 3, synchronizing signal synthesizer 4 connected to first and second receivers 2 and 3, synchronization detector 5 connected to synchronizing signal synthesizer 4, error corrector 7 connected to received signal synthesizer 6, decoder 8 connected to error corrector 7, display 9 connected to decoder 8, broadcaster name acquirer 10 connected to decoder 8, controller 11 for controlling these components, and memory 12 connected to controller 11.

A channel search is performed as follows. First receiver 2 and second receiver 3 each receive a signal from a broadcaster (hereinafter, transmission signal). Received signal synthesizer 6 synthesizes a received signal from the transmission signals received by first and second receivers 2 and 3. This is called a "synthesizing process". In this case, the received signal is generated by so-called diversity reception where the transmission signals are received by two receivers.

The received signal thus synthesized is transmitted from received signal synthesizer 6 to error corrector 7 where the error portion of the received signal caused during transmission is corrected. The corrected received signal is transmitted from error corrector 7 to decoder 8 where the information contained in the corrected received signal is decoded. Then, broadcaster name acquirer 10 extracts the broadcaster name from the information. The extracted broadcaster name is stored in memory 12 via controller 11.

Synchronizing signal synthesizer 4 synthesizes a synchronizing signal from the transmission signal received by either first receiver 2 or second receiver 3. This indicates single reception because the transmission signal is received by one receiver. Synchronization detector 5 determines whether synchronization has been established or not from the synthesized synchronizing signal. Synchronizing signal synthesizer 4 and synchronization detector 5 are under the control of controller 11.

Controller 11 takes in both the information transmitted from synchronization detector 5 indicating that synchronization has been established and the information transmitted from broadcaster name acquirer 10. Then, display 9 displays the transmission signal containing both of the information. The transmission signal thus displayed means the selected channel.

The transmission signal in the present first embodiment has a frame format containing a sync word. Synchronization detector 5 detects the sync word contained in the frame of the transmission signal, thereby improving the reliability of synchronization determination. The sync word contained in the frame is detected to determine whether the transmission signal is synchronization with the frame or not. Such control is defined as "frame synchronization". Besides the frame synchronization, the control of the present first embodiment can alternatively be performed by using TMCC (Transmission and Multiplexing Configuration Control) synchronization or AFC (Automatic Frequency Control) synchronization. TMCC synchronization shows the state of acquiring TMCC which is transmission parameter information. AFC synchronization shows the state of frequency synchronization of the receiving apparatus.

Figure 2:
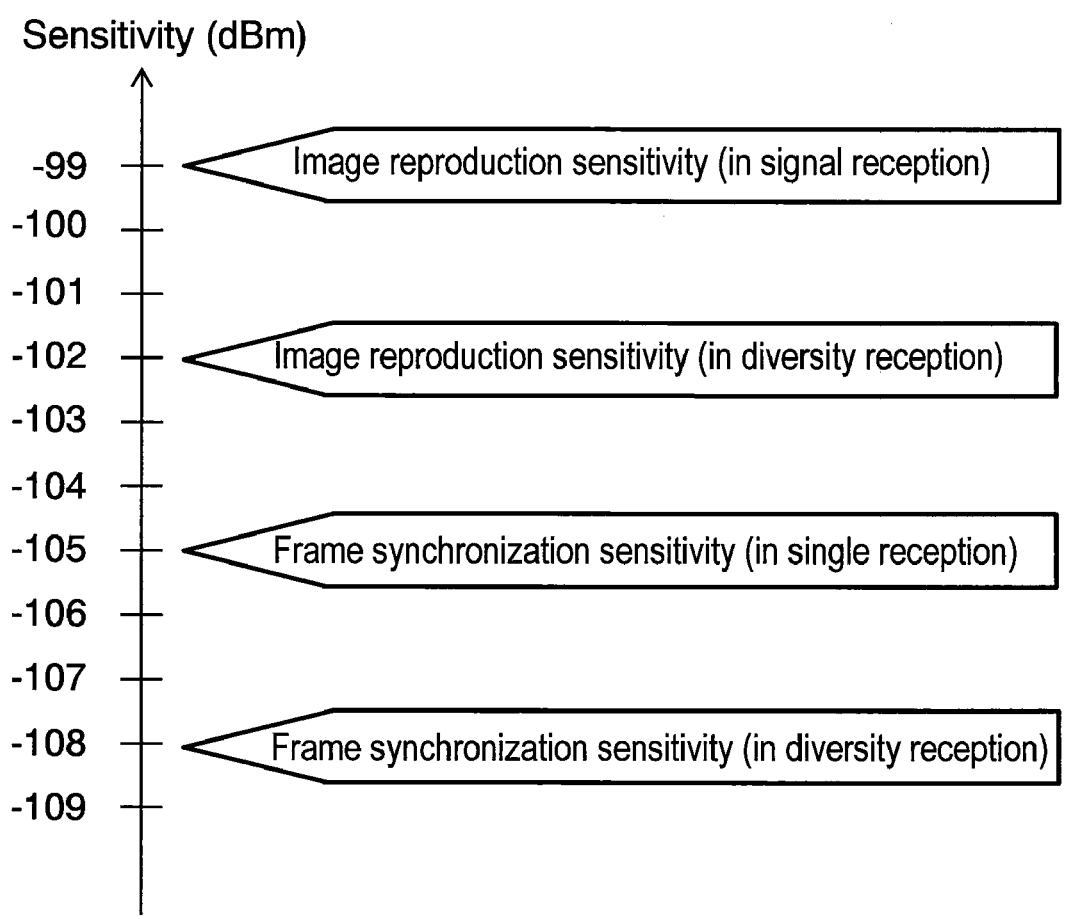
FIG. 2 is a schematic diagram showing the receiving sensitivity of the receiving apparatus according to the first embodiment of the present invention.

FIG. 2 is a schematic diagram showing the receiving sensitivity of the receiving apparatus according to the first embodiment. The receiving sensitivity includes image reproduction sensitivity and frame synchronization sensitivity both in diversity reception and in single reception. The diagram shows the following relation: image reproduction sensitivity (in single reception)>image reproduction sensitivity (in diversity reception)>frame synchronization sensitivity (in single reception)>frame synchronization sensitivity (in diversity reception). A smaller value indicates better sensitivity characteristics and the good sensitivity characteristics allow a signal to be detected even when the electric field intensity is low. Frame synchronization sensitivity has better characteristics than image reproduction sensitivity because of the following reason. Image information is generally encoded by a modulation scheme such as QPSK or 64-QAM, while synchronization information to be inserted to perform frame synchronization is generally encoded by a modulation scheme such as BPSK more resistant to noise than image information.

Figure 3:
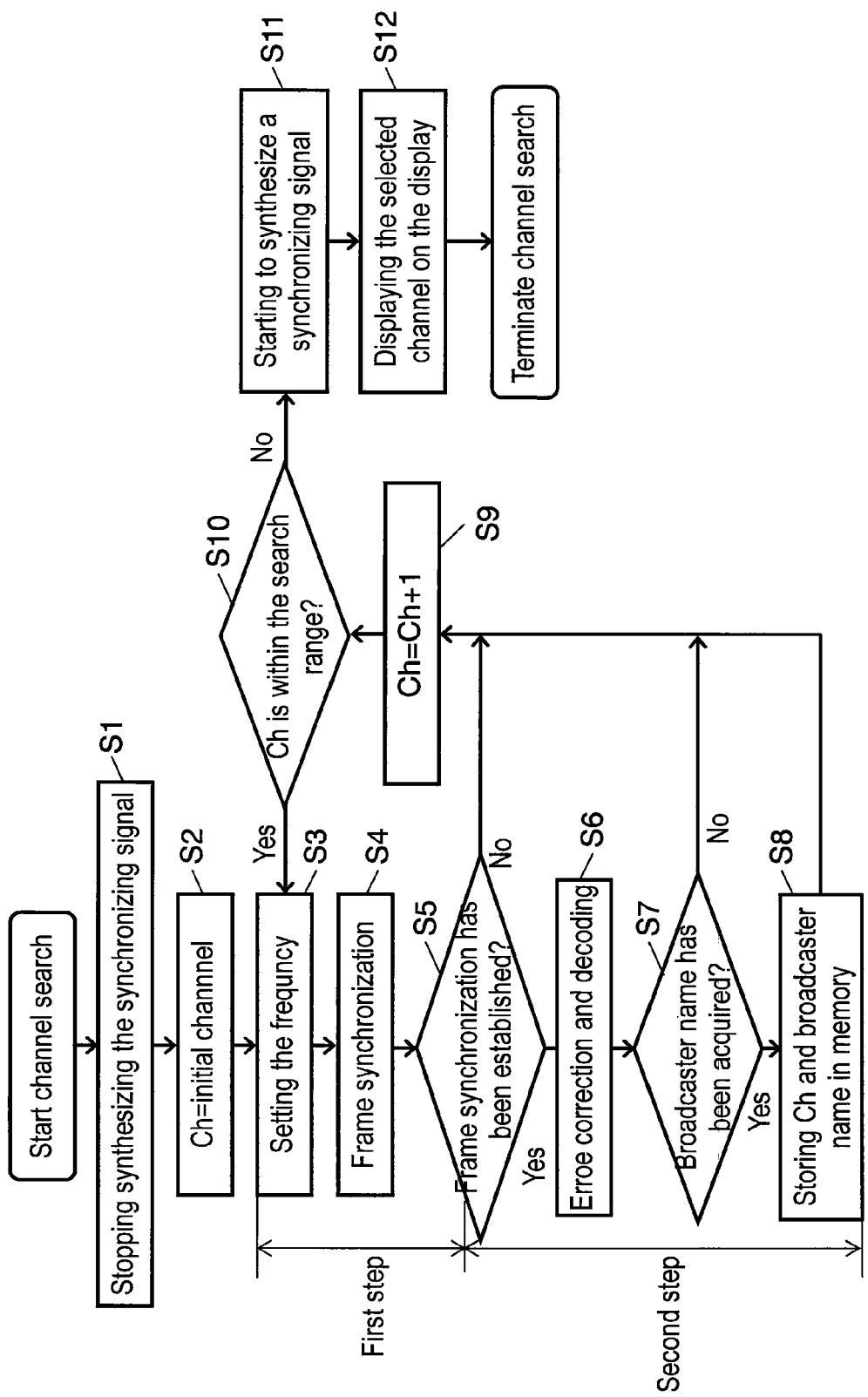
FIG. 3 is a control flow diagram of the receiving apparatus according to the first embodiment of the present invention.

FIG. 3 is a control flow diagram of the receiving apparatus according to the first embodiment. The control flow for the channel search using controller 11 of FIG. 1 is described below. In the description, a channel airing a program is found from UHF channels 13 to 62 in the TV signal band, and received signal synthesizer 6 continues to be in the diversity state.

First, synchronizing signal synthesizer 4 is stopped (step S1). In step S1, preparation is made to allow synchronization detector 5 to perform synchronization determination using the synchronizing signal transmitted from either first receiver 2 or second receiver 3. Next, the internal variable Ch is set to the initial channel "13" (step S2). Then, the frequency corresponding to the internal variable Ch is set to first and second receivers 2 and 3 (step S3). Synchronization detector 5 performs frame synchronization to detect the sync word (step S4). It is determined whether frame synchronization has been established or not (step S5). When frame synchronization cannot be established, the internal variable Ch is set to the next channel "14" (step S9). When frame synchronization has been established, on the other hand, error corrector 7 and decoder 8 perform error correction and decoding, respectively (step 6). Broadcaster name acquirer 10 determines whether the broadcaster name has been acquired or not (step S7). When the broadcaster name cannot be acquired, the internal variable Ch is set to the next channel "14" (step S9). When the broadcaster name has been acquired, on the other hand, the current channel "13" and the acquired broadcaster name are stored in memory 12 (step S8). The internal variable Ch is set to the next channel "14" (step S9). It is determined whether the internal variable Ch is within the search range (step S10). Since the internal variable Ch "14" is within the search range (channels 13 to 62) at this moment, the frequency corresponding to the internal variable Ch is set (step S3).

The aforementioned control is repeated and when the internal variable Ch becomes 63, which is outside the search range, the process is terminated. In other words, in step 10, the internal variable Ch is determined not to be within the search range. Synchronizing signal synthesizer 4 starts to synthesize a synchronizing signal (step S11). The selected channel is displayed on display 9 (step S12) and the channel search is terminated.

FIG. 4 shows the correspondence between the channel that has been detected to have a broadcast wave and the broadcaster name. In FIG. 4, the channel numbers are the selected channels that have been detected to have a broadcast wave.

The control flow of the conventional channel search does not include steps 1 and 11: the step of making synchronizing signal synthesizer 4 stop the synthesis of a synchronizing signal (step S1) and the step of making synchronizing signal synthesizer 4 start the synthesis of the synchronizing signal (step S11). In other words, a channel search is conventionally performed by setting both synchronizing signal synthesizer 4 and received signal synthesizer 6 either to single reception or to diversity reception. As a result, as shown in FIG. 2, the image reproduction sensitivity and the frame synchronization sensitivity are about 6 dB apart both in single reception and in diversity reception. In the reception environment between the two sensitivities, frame synchronization can be established, but the broadcaster name cannot be acquired because the electric field intensity is lower than the image reproduction sensitivity. Therefore, after the step of error correcting and decoding (step S6) and the step of acquiring the broadcaster name (step S7) shown in FIG. 3, the procedure proceeds to the step of searching for the next channel without acquiring the broadcaster name. In this conventional channel search, the error correction and decoding (step S6) is a cause of increasing the channel search time due to their large processing time. Moreover, when both synchronizing signal synthesizer 4 and received signal synthesizer 6 perform single reception, a detection failure may be caused due to the following reason. There is a range of electric field intensity where a signal cannot be detected in the channel search, although image reproduction can be performed in diversity reception because the broadcaster name is acquired with the image reproduction sensitivity (in single reception).

In contrast, in the control flow of the receiving apparatus according to the first embodiment of the present invention, a channel search is performed by setting synchronizing signal synthesizer 4 to single reception and received signal synthesizer 6 to diversity reception. The frame synchronization sensitivity in this case is the frame synchronization sensitivity (in single reception) of FIG. 2, and the sensitivity with which to acquire the broadcaster name is the image reproduction sensitivity (in diversity reception) of FIG. 2 because the received signal is subjected to a diversity process. The two sensitivities are about 3 dB apart, so that the range of electric field intensity where error correction and decoding (step S6) are performed without acquiring the broadcaster name can be smaller than in the conventional control flow. Furthermore, the broadcaster name can be acquired by processing a received signal in diversity reception, without causing any detection failure.

Thus, the channel search based on the present first embodiment is performed at high speed without detection failure. In the present first embodiment, the channel search is speeded up by determining the presence or absence of a channel for digital broadcasting in the first stage using frame synchronization and by searching the next channel when synchronization cannot be taken. Alternatively, before the first step, there can be provided a step of determining whether the electric field intensity exceeds a predetermined threshold or not.

INDUSTRIAL APPLICABILITY

The receiving apparatus according to the present invention improves both the reliability and the speed of a channel search by using the difference between the image reproduction sensitivity in diversity reception and the synchronization sensitivity in single reception. The present invention is particularly useful for mobile receiving terminals such as car navigation systems and portable phones because they need to form a channel selection table every time their receiving area changes.

The invention claimed is:

1. A receiving apparatus for receiving a transmission signal having a synchronizing signal and a broadcaster name information for each transmission channel, the receiving apparatus comprising: a first receiver; a second receiver; a received signal synthesizer connected to the first receiver and the second receiver, the received signal synthesizer synthesizing a received signal; and a single synchronization detector connected to the first receiver and the second receiver, the synchronization detector performing synchronization determination, wherein the receiving apparatus performs a channel search by making the synchronization detector perform the synchronization determination using the synchronizing signal of one of the first receiver and the second receiver, and wherein the receiving apparatus performs storing a channel number and the broadcaster name information for the each transmission channel.

2. The receiving apparatus of claim 1, further comprising:
an error corrector connected to the received signal synthesizer;
a decoder connected to the error corrector;
a display connected to the decoder;
a broadcaster name acquirer connected to the decoder; and
a memory connected to the broadcaster name acquirer, wherein
the transmission signal has broadcaster name information for each transmission channel.

3. The receiving apparatus of claim 1, wherein
the transmission signal has a frame format containing a sync word, and
the synchronizing signal is controlled by frame synchronization.

4. The receiving apparatus of claim 1, wherein
the transmission signal contains Transmission and Multiplexing Configuration Control (TMCC) information as transmission parameter information, and
the synchronizing signal is controlled by TMCC synchronization.

5. The receiving apparatus of claim 1, wherein
the synchronizing signal is controlled by Automatic Frequency Control (AFC) synchronization.

6. The receiving apparatus of claim 1, further comprising:
a synchronizing signal synthesizer connected between the synchronization detector and each of the first receiver and the second receiver, the synchronizing signal synthesizer synthesizing a synchronizing signal, wherein
the synchronizing signal synthesizer performs the synthesis of the synchronizing signal in normal times and stops the synthesis during the channel search.

7. A receiving apparatus for receiving a transmission signal having a synchronizing signal and a broadcaster name information for each transmission channel, the receiving apparatus comprising:
a first receiver;
a second receiver;
a received signal synthesizer connected to the first receiver and the second receiver, the received signal synthesizer synthesizing a received signal;
a single synchronization detector connected to the first receiver and the second receiver, the synchronization detector performing synchronization determination;
an error corrector connected to the received signal synthesizer, wherein the error corrector corrects an error portion of the received signal received from the received signal synthesizer;
a decoder connected to the error corrector;
a display connected to the decoder;
a broadcaster name acquirer connected to the decoder; and
a memory connected to the broadcaster name acquirer, wherein the receiving apparatus performs a channel search by making the synchronization detector perform the synchronization determination using the synchronizing signal of at least one of the first receiver and the second receiver.

8. The receiving apparatus of claim 7, wherein
the transmission signal has a frame format containing a sync word, and
the synchronizing signal is controlled by frame synchronization.

9. The receiving apparatus of claim 7, wherein
the transmission signal contains Transmission and Multiplexing Configuration Control (TMCC) information as transmission parameter information, and
the synchronizing signal is controlled by TMCC synchronization.

10. The receiving apparatus of claim 7, wherein
the synchronizing signal is controlled by Automatic Frequency Control (AFC) synchronization.

11. A receiving apparatus for receiving a transmission signal having a synchronizing signal, the receiving apparatus comprising:
a first receiver;
a second receiver;
a received signal synthesizer connected to the first receiver and the second receiver, the received signal synthesizer synthesizing a received signal;
a single synchronization detector connected to the first receiver and the second receiver, the synchronization detector performing synchronization determination; and
a synchronizing signal synthesizer connected between the synchronization detector and each of the first receiver and the second receiver, the synchronizing signal synthesizer synthesizing a synchronizing signal, wherein
the synchronizing signal synthesizer performs the synthesis of the synchronizing signal in normal times and stops the synthesis during the channel search, and
the receiving apparatus performs a channel search by making the synchronization detector perform the synchronization determination using the synchronizing signal of at least one of the first receiver and the second receiver.

12. The receiving apparatus of claim 11, further comprising:
an error corrector connected to the received signal synthesizer;
a decoder connected to the error corrector;
a display connected to the decoder;
a broadcaster name acquirer connected to the decoder; and
a memory connected to the broadcaster name acquirer, wherein
the transmission signal has broadcaster name information for each transmission channel.

13. The receiving apparatus of claim 11, wherein
the transmission signal has a frame format containing a sync word, and
the synchronizing signal is controlled by frame synchronization.

14. The receiving apparatus of claim 11, wherein
the transmission signal contains Transmission and Multiplexing Configuration Control (TMCC) information as transmission parameter information, and
the synchronizing signal is controlled by TMCC synchronization.

15. The receiving apparatus of claim 11, wherein
the synchronizing signal is controlled by Automatic Frequency Control (AFC) synchronization.

* * * * *